United States Patent [19]

Takami et al.

[11] Patent Number: 4,521,094
[45] Date of Patent: Jun. 4, 1985

[54] APERTURE VALUE CONTROL DEVICE UTILIZING FREQUENCY SIGNAL FROM FLASH UNIT FOR CAMERA

[75] Inventors: Satoshi Takami; Yoshifumi Kuroki, both of Tokyo, Japan

[73] Assignee: Asahi Kogaku Kogyo Kabushiki Kaisha, Tokyo, Japan

[21] Appl. No.: 648,360

[22] Filed: Sep. 7, 1984

Related U.S. Application Data

[63] Continuation of Ser. No. 317,377, Nov. 2, 1981, abandoned.

[30] Foreign Application Priority Data

Nov. 4, 1980 [JP] Japan .......................... 55-157743[U]

[51] Int. Cl.³ .......................................... G03B 15/05
[52] U.S. Cl. .................................................. 354/423
[58] Field of Search ................... 354/23 D, 32, 33, 35, 354/60 A, 60 F, 139, 145, 149, 423, 422

[56] References Cited

U.S. PATENT DOCUMENTS 4,058,816 11/1977 Nobusawa ............................ 354/43
4,299,463 11/1981 Kawamura et al. ................ 354/149
4,367,932 1/1983 Ishikawa et al. .................... 354/149
4,371,243 2/1983 Takishima et al. ................. 354/145

Primary Examiner—Russell E. Adams
Attorney, Agent, or Firm—Sughrue, Mion, Zinn, Macpeak, and Seas

[57] ABSTRACT

The aperture value in a camera having a flash unit is controlled by a frequency signal from the flash unit. The frequency of the signal is variable in accordance with the light emission characteristics of the flash unit.

7 Claims, 4 Drawing Figures

APERTURE VALUE CONTROL DEVICE UTILIZING FREQUENCY SIGNAL FROM FLASH UNIT FOR CAMERA

This is a continuation of application Ser. No. 317,377 filed 11/02/81 now abandoned.

BACKGROUND OF THE INVENTION

This invention relates to an aperture control device for a camera with a flash unit such as an automatic electronic flash.

Heretofore, when taking a picture with a flash unit, the camera has been set for a predetermined aperture value so that a correct quantity of light will be obtained on the film surface. With a flash unit wherein the quantity of light emitted from the flash unit is controlled according to the quantity of the emitted light reflected from an object to be photographed, a correct quantity of light is always obtained on the film surface by setting the aperture value to a predetermined value corresponding to the setting of desired flash emission on the flash unit. However, if the aperture value of the camera is carelessly changed, then the correct quantity of light will not be obtained on the film surface, with the result that the resulting picture is unsatisfactory. Accordingly, it is necessary to take great care in setting the aperture value of the camera whenever a photographing operation is carried out with the camera.

SUMMARY OF THE INVENTION

Accordingly, an object of this invention it to eliminate the above-described difficulty. More specifically, this is achieved by providing an aperture control device for a camera in which a flash unit supplies a signal for controlling the aperture value of the camera to allow the camera to take a picture with a correct quantity of light. In the preferred embodiment of the invention, an aperture control signal is sent to an aperture control device in accordance with the desired light quantity setting on the flash unit, so that the camera aperture is automatically controlled to a value which properly corresponds to the light setting.

BRIEF DESCRIPTION OF THE DRAWINGS

This invention will now be described in detail with reference to the accompanying drawings, in which.

DETAILED DESCRIPTION OF THE INVENTION

Figure 1:
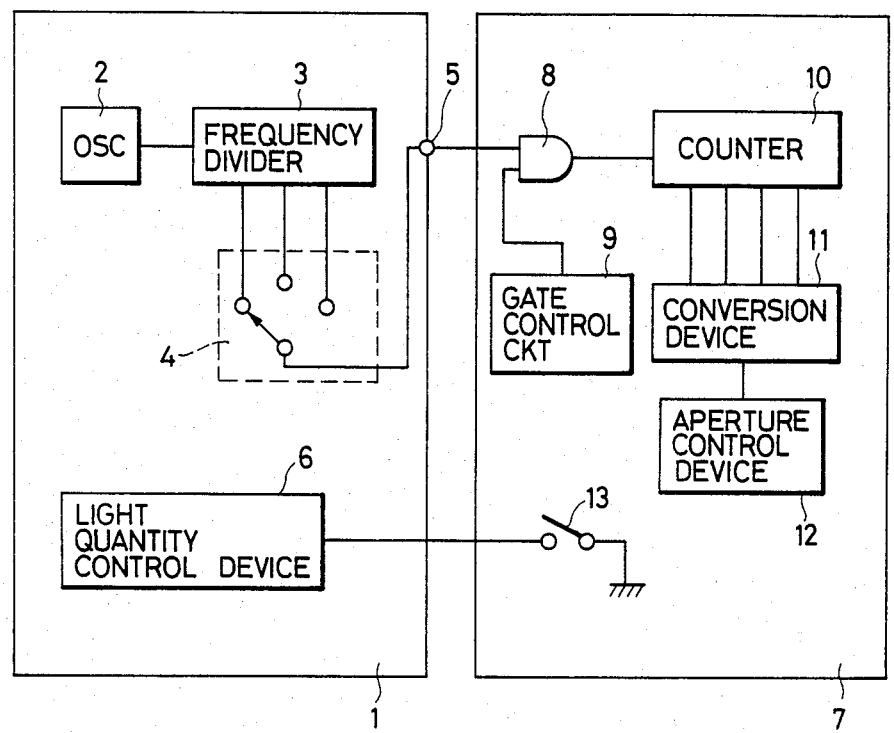
FIG. 1 is a block diagram showing one embodiment of this invention.

FIG. 1 is a block diagram showing one embodiment of this invention. In FIG. 1, reference numeral 1 designates a flash unit. Only the components of the flash unit 1 which concern this invention are shown in FIG. 1. The flash unit 1 comprises: an oscillator 2; a frequency divider 3 for subjecting a pulse signal outputted by the oscillator 2 to frequency division; a switch 4 for selecting outputs of the frequency divider 3; a terminal 5 through which the selected output is delivered; and a device 6 for controlling the quantity of emitted light (hereinafter referred to as "a light quantity control device 6"). In general, a guide number switching means provided in an automatic electronic flash can be employed as the switch 4. The light quantity control device 6 may comprise: a light emitting unit (not shown); and a means (not shown) for controlling the operation of the light emitting unit according to the quantity of light reflected from an object to be photographed as is well known in the art, e.g. as disclosed in Japanese Patent Application Publication No. 38413/1973.

Referring to FIG. 1, reference 7 designates a camera. Only the components of the camera 7 which concern the present invention are shown in FIG. 1. The camera 7 comprises: a gate circuit 8; a gate control device 9 for controlling a period of time for which the gate circuit 8 is open; a counter 10 for counting a pulse signal outputted by the gate circuit 8; a conversion device 11 for subjecting the output of the counter 10 to conversion; an aperture control device 12 for controlling the aperture value of the camera 7 with the aid of the conversion device 11; and a switch 13 for causing the flash unit 1 to emit light.

Various known techniques can be used to control the aperture value; e.g. a desired aperture value may be achieved by controlling the operation period of the lens stop. However, since the particular technique used does not constitute a part of this invention and is not essential for a proper understanding of this invention, a detailed description of aperture control device 12 will be omitted.

The operation of the above-described various elements will now be described.

As described above, the oscillator 2 in the flash unit 1 outputs a pulse signal having a predetermined frequency. This signal is subjected to frequency division by the frequency divider 3, and a resultant frequency is selected by the switch 4. It is assumed that the frequency thus selected is represented by F1. In the case where the light quantity control device 6 is so designed that the user can select the quantity of emitted light, the frequency selecting operation of the switch 4 is effected in association with the selection of the quantity of emitted light. If the device 6 can only provide one predetermined light quantity, the switch 4 would be unnecessary and the signal provided to the gate 8 would always have the same frequency. The circuits of the oscillator 2 and the light quantity control device 6 are formed independently of each other, and only the switch 4 is operated in association with the light quantity control device 6.

Figure 2:
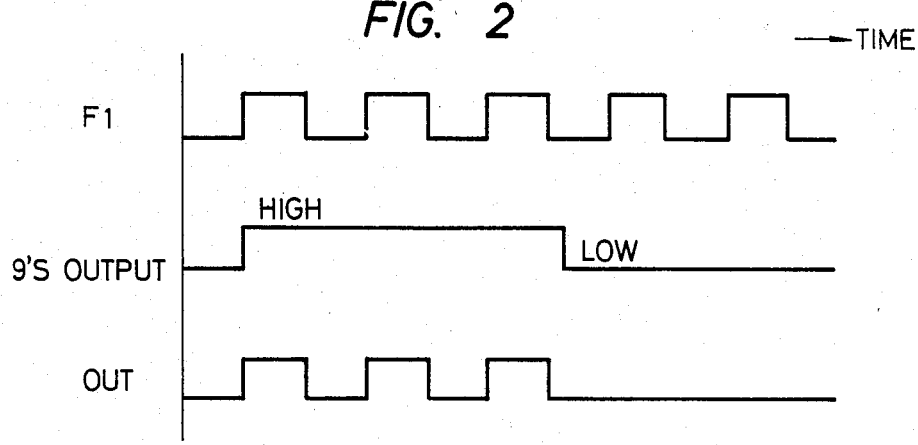
FIG. 2 is a time chart for a description of the operation of the gate circuit 8.

The signal having the frequency F1 is applied to the gate circuit 8 in the camera 7 through the terminal 5 (which is a connecting point other than the "X" contact) connected to the camera 7. As was described above, the gate control device 9 controls the period of time for which the gate circuit 8 is open. Therefore, the number of pulses of the F1 signal supplied to the counter 10 through the gate circuit 8, is determined by the gate control device 9. This will become more apparent from FIG. 2. In FIG. 2, reference character "F1" designates the signal having the frequency F1, and "9's output" the output of the gate control device 9. Assuming that the gate circuit 8 is an AND circuit, three pulses are applied to the counter 10 in this case. The aperture control device 12 is operated by the output signal of the conversion device 11 which is obtained by subjecting the output of the counter 10 to conversion.

The switch 13 is a switch for the "X" contact on the camera which causes the flash unit 1 to emit light. The switch 13 may be connected through a hot shoe. If an additional contact is provided, the switch may be connected through a cord.

Figure 3:
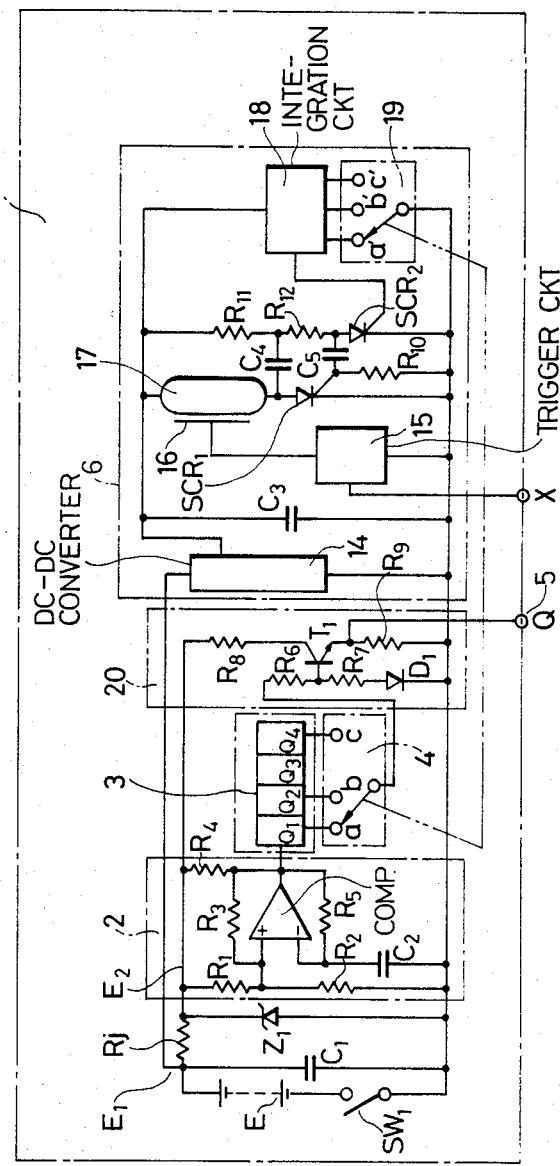
FIG. 3 is a block diagram showing in more detail the flash unit of FIG. 1.
Figure 4:
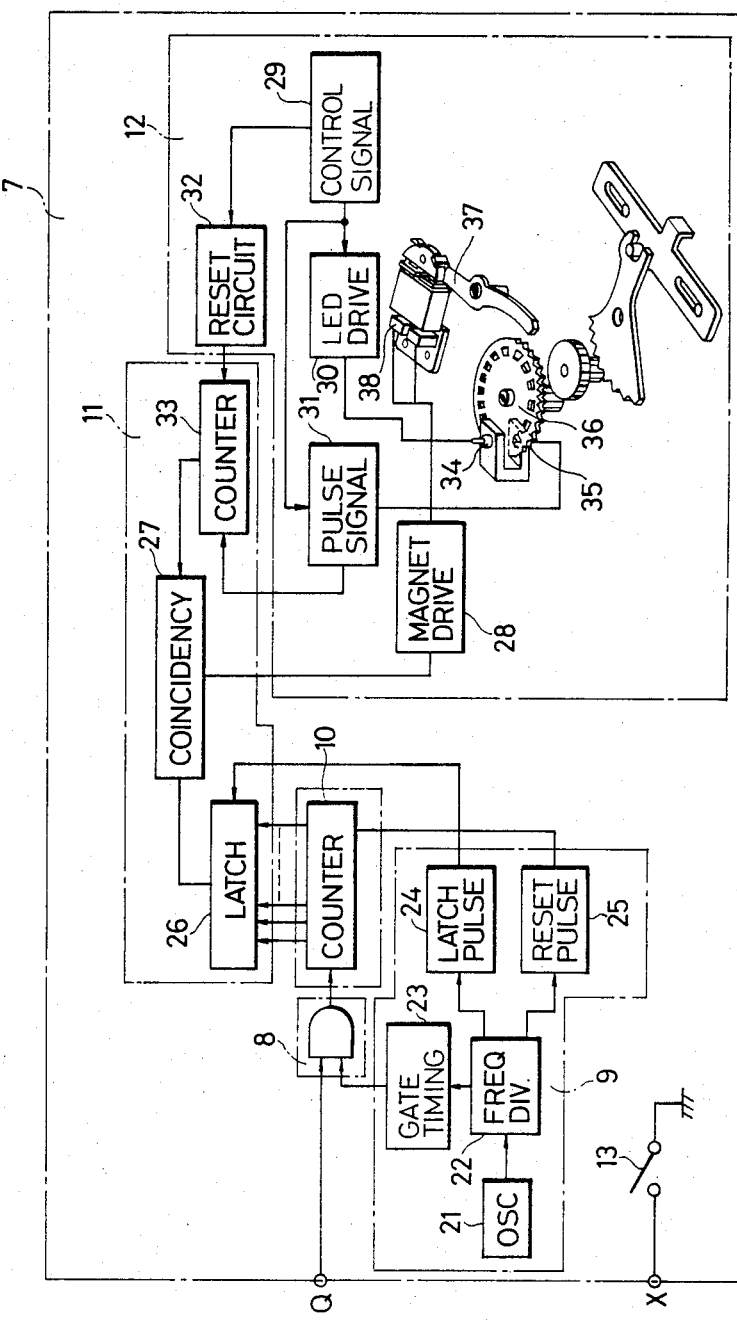
FIG. 4 is a block diagram showing in more detail the camera portion 7 of FIG. 1.

As will be apparent, the object of the invention is achieved by operating the above components in a sequence such that, before the flash unit 1 emits light, the aperture value of the camera is controlled to the proper predetermined value which, in conjunction with the amount of emitted light, will result in a proper exposure. This will be described in more detail in combination with the operation of conventional circuits with reference to FIGS. 3 and 4. In FIG. 3, $S_1$ is a power switch; 14, a DC-DC converter; 15, a trigger circuit; 16, a trigger electrode; 17, light tube; and 18, an integration circuit, all of which operate in a conventional manner. The oscillator 2 in the flash unit 1 is a conventional astable multivibrator using a comparator in this case. The operation of the multivibrator itself is well known and will not be described. The output frequency FO of the oscillator 2 is determined from the time constants of resistors $R_1$ through $R_5$ and a capacitor $C_2$. The output signal of the oscillator 2 is applied to the input terminal of the frequency divider 3. The frequency divider 3 may be a conventional one made up of flip-flop circuits and has different frequency division output terminals $Q_1$ through $Q_4$. Obviously, more flip-flop circuits may be added to the frequency divider 3 to obtain other frequencies. The terminals a, b and c of the switch 4 are connected to the frequency divider 3 so that output frequencies a=FO/2, b=FO/4 and c=FO/16 can be obtained from the frequency divider 3.

The switch 4 is so designed that it can select any one of the frequencies which are obtained by subjecting the output frequency FO of the oscillator 2 to frequency division in the frequency divider 3. It is assumed that a frequency F1 is selected by the switch 4. Thus, the frequency F1 should correspond to an aperture value which will result in a proper exposure in combination with the amount of light that will be emitted, which amount of light is determined by the integration circuit 18 in the light quantity control circuit 6 in a known manner. The selecting operation of the switch 4 is therefore effected in association with a switch 19 which selects the quantity of emitted light in the light quantity control device 6. By way of example, if a'=F16, then b'=F11 and c'=F5.6.

The frequency F1 selected by the switch 4 is applied to a level conversion circuit 20 which is provided for converting the output signal level of the frequency divider 3 to a voltage level which satisfies the input conditions of the camera 7. A temperature compensating semiconductor element $D_1$ is preferably provided in the level conversion circuit 20 so that the voltage level is not affected by temperature.

On the output side of the level conversion circuit 20, the emitter of a transistor $T_1$ is connected to a resistor $R_9$. The connecting point of the transistor $T_1$ and the resistor $R_9$ is coupled through the Q terminal 5 of the flash unit 1 to the gate circuit 8 of the camera 7.

The gate circuit 8 is a two-input unit AND circuit. The frequency signal F1 from the flash unit 1 is applied to one of the two input terminals of the gate circuit 8, and a gate signal is applied to the other input terminal. The gate circuit 8 is maintained open. When the gate signal is at a high logic level, the gate circuit 8 outputs a pulse signal which is applied to the counter 10.

The gate control device 9 has an oscillator 21 and a frequency division circuit 22 for subjecting the output frequency of the oscillator 21 to frequency division. The frequency division circuit 22 applies signals required for setting a gating time to a gating time generating circuit 23, and to a reset pulse generating circuit 25 adapted to generate a reset signal for resetting the counter 10, and a latch pulse generating circuit 24 adapted to generate a latch signal for a latch circuit 26.

When the output reset signal of the reset pulse generating circuit is at a low logic level, the output signal of the gate circuit 8 is inputted to the counter 10. The output signal of the counter 10 is applied to the latch circuit 26, and the signal applied to the latch circuit 26 is held in response to the output latch signal of the latch pulse generating circuit 24. The signal thus held is inputted to a coincidence circuit 27.

A pulse signal provided by the aperture control device 12 in the camera is applied to a counter 33 in the conversion device 11 and the output signal of the counter 33 is applied to the coincidence circuit 27. When the two input signals coincide with each other in the coincidence circuit 27, the output signal of the latter 27 is applied to an EE magnet drive circuit 28 in the aperture control device 12 to drive an EE magnet 38.

A photo-interrupter 36 is provided in the aperture control device 12 on the camera side. The photo-interrupter 36 operates in association with a camera lens stop mechanism adapted to control the aperture of the camera 7; that is, it is turned in association with the lens stopping operation.

The photo-interrupter 36 has a plurality of slits and an LED (light emitting diode) 34 and a photo-transistor 35 are fixedly disposed in such a manner that the LED 34 and the photo-transistor 35 confront one another through each slit.

The peripheral portion of the photo-interrupter 36 is formed into a ratchet wheel. The end of a locking pawl 37 is caused to contact the ratchet wheel by the operation of the magnet, to stop the rotation of the photo-interrupter 36 to thereby achieve the aperture control.

The aperture control device 12 further comprises a control signal generating circuit 29 which is operated in association with the camera. The control signal generating circuit 29 controls an LED drive circuit 30 which turns on the LED 34 according to the settings of the camera in operating an automatic aperture control device, and also controls a pulse signal generating circuit 31 which generates a pulse signal when the photo-transistor 35 receives light emitted by the LED 34 through the slit. Finally, circuit 29 controls a reset circuit 32 which generates a reset signal for resetting the contents of the counter 33 whenever the camera shutter is operated.

When the camera is set for automatic aperture control, in association with the operation of the camera the control circuit 29 applies a control signal to the reset circuit 32. As a result, the reset circuit 32 produces the reset signal to reset the contents of the counter 33. When conditions necessary for automatic aperture control are set, the circuit 29 operates the LED drive circuit 30 to turn on the LED 34. As a result, the phototransistor 35 receives light emitted by the LED 34 through the slit of the photo-interrupter 36. Therefore, as the aperture stops down and the wheel 36 rotates, the pulse signal generating circuit 31 is controlled to convert the output signal of the photo-transistor 35 into a pulse signal as described above.

The output pulse signal of the pulse signal generating circuit 31 is applied to the counter 33. The generation of the pulse signal by the pulse signal generating circuit 31 is continued until, in the coincidence circuit 27, the output of the counter 33 coincides with the data which has been applied to the coincidence circuit 27 from the flash unit 1. At this point, the aperture value corresponds to that selected by the switch 4, and the output coincidence signal of the coincidence circuit 27 is then applied to the magnet drive circuit 28 to drive the EE magnet 38 to thereby disengage the locking pawl therefrom. As a result, the rotation of the photo-interrupter 36 is stopped, and accordingly the lens stop mechanism operating in association with the rotation of the photo-interrupter 36 is also stopped at the aperture value which has been set for the flash unit 1.

With the above system configuration, when the amount of emitted light is changed by the switch 19, the switch 4 will be correspondingly changed to select a different frequency signal for application through the gate 8 to the counter 10. For example, if the selected light output is doubled, the aperture value should be changed by one stop to maintain the proper amount of exposure light. Accordingly, the switch 4 will select a higher frequency signal for application to the counter 10 so that the value in latch 26 will be larger. Thus, the stop down operation will last longer before coincidence is detected, and the final aperture value will be the proper size such that, even with the different light emission value, the exposure light will remain the same and a proper exposure will be achieved.

As is apparent from the above description, according to this invention, the flash unit 1 supplies the signal for controlling the aperture value of the camera 7, and therefore it is unnecessary to manually operate the camera lens stop, and the careless change of the aperture value is never caused, with the result that a correct quantity of light is obtained on the film surface at all times. Since the aperture control signal is supplied in frequency form, the frequency can be readily changed by use of the frequency divider, and erroneous operations caused by noise, e.g. in an analog signal, can be eliminated.

What is claimed is:

1. An aperture control system for a camera having a flash unit, said aperture control system being of the type having means for generating an aperture value control signal and an aperture value control device on said camera which controls the aperture of said camera to a value in accordance with the value of said aperture value control signal, said control system comprising:
   first means on said flash unit for generating a digital signal representing a desired aperture value in accordance with the flash emission characteristics of said flash unit, and for transmitting said digital signal to said camera;
   second means on said camera for receiving said digital signal and for generating said aperture value control signal before said flash unit emits light in accordance with the value of said digital signal transmitted from said flash unit;
   third means on said camera for generating a second digital signal representing the actual aperture value of said camera during a stopdown operation;
   comparison means on said camera for comparing said second digital signal with said aperture value control signal and for generating a coincidence signal upon detecting coincidence between said aperture value control signal and said second digital signal; and
   said aperture control device stopping the adjustment of said aperture in response to said coincidence signal from said comparison means, whereby the aperture of said camera is automatically controlled to said desired value without the necessity of a camera operator manually setting the camera aperture to said desired value.

2. An aperture control system as claimed in claim 1, wherein said aperture value control signal is a count value.

3. An aperture control system as claimed in claim 1, wherein said aperture value control signal value is variable and said first means includes means for varying the value of said digital signal.

4. An aperture control system as claimed in claim 3, wherein said means for varying comprises:
   an oscillator on said flash unit; and
   a variable frequency divider receiving an output of said oscillator and providing as said digital signal an output having a frequency which varies in accordance with said aperture value;
   said second means including means on said camera for receiving said variable frequency divider output and generating said aperture value control signal having a value in accordance with the frequency of said digital signal.

5. An aperture control system as claimed in claim 4, wherein said means on said camera for receiving said variable frequency signal comprises:
   a gate circuit having an input for receiving said variable frequency signal and an enabling terminal;
   gate signal generating means for providing to said enabling terminal a gate signal of predetermined duration; and
   counter means for receiving said variable frequency signal from said gate circuit during said enabling signal, said counter counting at a rate corresponding to the frequency of said variable frequency signal, the value in said counter at the end of said aperture value enabling signal comprising said control signal.

6. An aperture control system as claimed in claim 4, wherein said variable frequency divider comprises a frequency divider circuit having a plurality of outputs of different frequencies and a selection switch for selecting one of said plurality of outputs.

7. An aperture control system as claimed in claim 6, wherein said flash unit includes a switch for varying the light emission characteristics of said flash unit, which switch is ganged to said selection switch.

* * * * *